Patented Feb. 24, 1925.

1,527,536

UNITED STATES PATENT OFFICE.

CLARENCE P. BYRNES, OF SEWICKLEY, PENNSYLVANIA.

METHOD OF REFINING PIG IRON.

No Drawing.   Application filed July 21, 1922.   Serial No. 576,626.

*To all whom it may concern:*

Be it known that I, CLARENCE P. BYRNES, a citizen of the United States and a resident of Sewickley, in the county of Allegheny and State of Pennsylvania, have invented a new and useful Improvement in the Method of Refining Pig Iron, of which the following is a full, clear, and exact description.

My invention relates to the refining of molten pig iron into steel or wrought iron, and is designed to provide a process by which steel, of the quality now made in open-hearth and electric furnace processes, may be made more rapidly and cheaply, and the cost of making wrought iron may be reduced.

In carrying out my process in its preferred form, molten pig metal is subjected to the following operations:

1. Reducing or removing some of the metalloids other than carbon and preferably at a relatively low temperature where, in the presence of a slag containing iron oxides, with or without other basic reagents, the silicon, and preferably the phosphorus content, will be reduced, and preferably substantially eliminated. The manganese and carbon may be and preferably are somewhat reduced in this part of the process.

2. Dividing the treated metal while molten, as for example, by granulating it to a solid or semi-molten separated condition and subjecting it to the action of a slag containing iron oxides, by which the carbon will be rapidly attacked and reduced, owing to the large surface of the heated drops or granules exposed thereto. During this part of the operation, other metalloids will also be reduced and carried into the slag, the carbon passing off as carbon monoxide, which will burn in the air to carbon dioxide. The slag and metal are then preferably separated, at least in part.

If wrought iron is to be made, the supernatant slag is poured off and the mass of mixed slag and metal granules compressed, either in the mold or vessel where the mixing is carried out, or the mass dumped out and compressed in a squeezer or press.

3. For steel making, collecting the divided purified metal, remelting the metal, if granulated, and refining it either with the same slag or in the presence of another or reformed slag, additions made, if desired, and the metal then tapped before or after the additions are made.

The several parts of the process may be carried out in many different ways and with many types of furnaces. For example, the first part or step may be carried out in a large washing open-hearth furnace or heated mixer, preferably of the tilting type, a pool of metal and slag being preferably maintained therein, and molten pig metal poured in through the overlying slag, and portions of the metal with reduced metalloids tapped out intermittently. Or it may be carried out in a stationary open-hearth furnace by a step similar to the first portion of the Monel process, wherein the silicon and phosphorus are substantially eliminated and the manganese reduced. My second step may be carried out (without tapping the slag) by lowering the temperature to a point where the metal begins to granulate, when the carbon in the metal will be rapidly attacked by the ferrous oxides and will pass off as CO, burning in the air to $CO_2$. After this action, the temperature is raised and the slag tapped off and a new slag formed, the metal becoming melted and then being refined. This is, however, a difficult procedure in an open-hearth furnace, as the bath is liable to freeze. Hence, after the first part of the Monel process is performed and the phosphorus and silicon eliminated and the manganese reduced, a portion of the carbon also being oxidized, I prefer to tap out the molten metal and pour it into a bath of slag containing iron oxides (preferably FeO in the main) this action dividing or granulating the metal and the removal of carbon occurring as the drops or granules descend through the slag bath.

The second step may be carried out in an electric furnace, an acid open-hearth or a ladle or mold. In pouring into a slag in the second step, the metal may be divided into several streams by suspending under the pouring ladle a runner having a plurality of pouring holes.

In many cases where the treated pig metal from the first step is poured into such a slag bath, which also preferably contains silica, the slag bath is sufficiently lower in temperature than the metal to divide the metal as it enters and preferably to granulate it. Cold slag may be gradually fed into the bath during this pouring in of the metal. Or the slag bath may be of higher temperature, but still lower than the metal temperature, so that the metal, while divided on entering, will collect as liquid metal in the bottom of the furnace or receptacle. The granulating is preferable, since the carbon reduction proceeds more rapidly. After this dividing of the metal, it is remelted, if granulated, and refined, preferably with additions to the slag or a remaking of it.

The first step may also be carried out in accordance with the Bell-Krupp process, wherein molten pig metal is treated with iron oxides at a relatively low temperature in a heated revolving hearth lined with iron oxides, and wherein the larger percentage of the silicon and phosphorus are removed in seven to ten minutes. The second step may also be carried out in this hearth by rapidly lowering the temperature as soon as the carbon removal begins. The metal will then granulate and its carbon be rapidly attacked by the oxides and pass off as gas. Or I may remove the washed metal, divide it and treat with another slag, as by pouring it into a suitable molten slag containing iron oxides.

The first and second stages may also be carried out in an electric furnace where the temperature is under better control and the temperature may be lowered to granulate in the second step. Thereafter the slag may be tapped out and a second slag then formed, or additions made to the slag, and the process carried on through all steps, if granulation is carried out by temperature reduction relative to the carbon content.

Of course, as the carbon content falls, the melting point rises. In all these cases, the bath for the first step is preferably relatively shallow to give the oxides better action on the metalloids.

If heat is supplied by combustion, the steps or part of them may be carried out in an acid open-hearth furnace, though a basic open-hearth with lime in the slag will aid in removing and reducing phosphorus. In all cases, the second step of bringing the divided metal in contact with slag should be carried out with a molten slag containing a relatively large amount of ferrous oxide, as this will react vigorously with the carbon in the metal, especially where the divided metal is at least partially solidified. This slag may also contain lime and other basic materials.

The first step may also be carried out in a large tilting basic open-hearth furnace where iron ore and limestone are added to the overlying slag from time to time and molten pig charges are poured in from time to time through this slag. In this case, the silicon and phosphorus are largely oxidized almost at once as in the first stages of the Talbot process. Portions of this washed metal may then be tapped out and subjected in divided condition to a molten slag containing iron oxide and silica to reduce the carbon, as above described.

The second step in this or other cases may be carried out in an electric furnace containing a new molten iron oxide slag, after which the temperature may be raised rapidly and the metal refined, with or without a new or modified slag.

The final slag in the refining for steel making should be relatively low in oxidizing power so that the metal will be freer of oxide and less wild. The temperature of the washed metal used in the second step, as well as the temperature of the slag used therein, should be regulated and controlled, so that the carbon reaction will take place, but not too violently or explosively. The higher the temperature of the molten metal added, the more violent is the reaction; and the lower the temperature of the slag, the greater is the solidifying action in granulating. By feeding in cold oxides along with the metal, the slag bath temperature will be reduced and the metal may be below its welding temperature. By regulating the relative volumes, the metal may granulate and weld together in the bottom of the furnace or receptacle, or it may divide and the drops remain molten and collect in the bottom portion. The slags used in the first and second steps or either of them may be artificially formed of scale, cinder, iron oxide, silica, etc., in a special furnace, and a carbon blanket is preferably kept on the molten slag in the slag-forming furnace to reduce the $Fe_2O_3$ to $FeO$ and keep as much ferrous oxide in the slag as possible.

The operations may be carried out in one, two or threee furnaces, by separating the slag and metal as above described, as in the same furnace the slag may be tapped off and fresh slag formed or added; or in using different furnaces, the metal may be tapped out and added to other slags.

Slags of the puddling variety are efficient in the first and second steps; that is, those containing relatively large amounts of iron oxides with silica. As one example, the first step may be carried out in a large tilting furnace in the manner of the first portion of the Talbot cycle. The tapped out washed metal may then be poured into an iron silicate slag in an electric furnace, and after the carbon reaction in the divided metal, the temperature may then be raised, the slag charged or modified, and the metal refined therein.

As another example, under accurate, rapid and efficient heating control, the operations may be performed in one furnace or vessel, the granulating being performed by temperature reduction, the slags being charged and reformed if and as desired.

As another example, after the first step is carried out at low temperature in a revolving hearth as in the Bell-Krupp process of washing, the washed metal may be poured into and through an iron oxide slag bath in an electric furnace, or an acid open-hearth, with the relative temperature regulated to divide and preferably granulate the metal, and the temperature then raised to melt and finish into steel, with proper additions to the slag and metal. Again, in a stationary open-hearth furnace, a molten slag bath may be formed and a series of ladles of the washed molten metal poured in through the slag blanket or bath and the slag then tapped off after the proper time interval, and the bath then finished as in the Monel method. In this case, if there is sufficient difference in temperature between the molten slag and the washed metal teemed in, the metal will be divided considerably and the carbon quickly attacked and reduced. It may in this case collect as a molten layer underneath the slag layer.

Temperature regulation is important in the first and second parts of my process, since the preliminary reduction of metalloids, mainly prior to carbon reduction, should be carried out at fairly low temperatures to give quick attack on the silicon and phosphorus; and the relative temperatures in the second or carbon reduction process should be regulated, either by regulating the heat supplied or by oxide additions, or both, to cause dividing of the washed metal and quick attack on the carbon of this metal. The dividing of the washed metal is preferably carried out by pouring into or through a slag layer, if a combustion furnace is employed. These temperatures, of course, will vary according to the amount of metalloids in the metal, the character of the slag, etc.

As regards steel manufacture, the main feature of my process lies in first reducing or substantially eliminating the metalloids, such as silicon and phosphorus, which are attacked at a comparatively low temperature, and then subdividing the metal, and with at least a part of the original heat, subjecting it to the action of a slag containing a larger proportion of iron oxides, preferably ferrous oxides in the main.

As regards wrought iron, the main feature lies in pouring the washed molten pig metal, after the low temperature reduction or elimination of silicon and phosphorus, into an iron oxide bath and subdividing the metal therein to remove carbon and other metalloids and form a mixed mass of metal and slag, preferably at a welding temperature.

The advantages of the process lie in the more rapid elimination or reduction of the carbon and the consequent lessening in the time of heats and increasing of the production. The steel produced is of open-hearth or electric furnace quality and superior to Bessemer or ordinary duplex steel.

Different processes and apparatus may be employed and the steps may be varied within the scope of my broader claims.

I claim:

1. In the manufacture of steel, the steps consisting of washing out some of the metalloids from molten pig metal, subdividing the washed metal and subjecting the subdivided metal to the action of a slag containing iron oxides.

2. In the manufacture of steel, the steps consisting of washing out some of the metalloids from molten pig metal, in the presence of molten slag, then separating the metal and slag, subdividing the washed metal and subjecting the subdivided metal to the action of a slag containing iron oxides.

3. In the manufacture of steel, the steps consisting of washing out some of the metalloids from molten pig metal at a relatively low temperature in the range where silicon and phosphorous are readily attacked, subdividing the washed metal while relatively high in carbon, and subjecting the subdivided metal to the action of a slag containing iron oxide.

4. In the manufacture of steel, the steps consisting of washing out some of the metalloids from molten pig iron in the presence of a slag containing iron oxides, and then subdividing the washed metal and subjecting it to the action of a slag containing iron oxides.

5. In the manufacture of steel, the steps consisting of washing out some of the metalloids in the presence of a slag containing iron oxides, separating the molten metal and slag while the metal is relatively high in carbon, and then subdividing the washed metal and subjecting it to the action of a slag containing iron oxides.

6. In the manufacture of steel, the steps consisting of washing out some of the metalloids from molten pig metal, subdividing the washed metal, subjecting the subdivided metal to the action of a slag containing iron oxides, and then finish-refining the metal with another or modified slag.

7. In the manufacture of steel, the steps consisting of granulating molten washed metal containing the major portion of the original carbon, and subjecting the granulated metal to the action of an iron oxide slag.

8. In the manufacture of steel, the steps consisting of subdividing washed metal while relatively high in carbon, and subjecting it to the action of an iron oxide slag while in divided condition.

9. In the manufacture of steel, the steps consisting of pouring molten washed metal into a bath of molten slag containing iron oxide and thereby subdividing the metal and causing rapid reduction of its carbon content.

10. In the manufacture of steel, the steps consisting of subdividing washed metal and subjecting it to the action of an iron oxide slag while in divided condition, and then finish-refining the decarbonized metal in the presence of another or modified slag.

11. In the refining of pig metal, the steps consisting of substantially eliminating the phosphorus while the metal is at a comparatively low temperature, substantially separating the metal and slag, and subdividing the metal in the presence of another iron oxide slag.

12. In the refining of pig metal, the steps consisting of substantially eliminating the phosphorus while the metal is at a comparatively low temperature, substantially separating the metal and slag, and pouring the metal into molten ferrous oxide slag materials of sufficient volume to cause subdivision of the metal therein.

13. In the refining of pig metal, the steps consisting of washing out the main portion of the silicon and phosphorus at comparatively low temperature, and then pouring the washed metal into and through a molten iron oxide slag bath of sufficient volume to cause subdivision of the metal therein.

14. In the the refining of pig metal, the steps consisting of washing out the main portion of the silicon and phosphorus at comparatively low temperature, and then pouring the washed metal into and through an iron oxide bath at a temperature difference substantially causing granulating of the metal.

In testimony whereof I have hereunto set my hand.

CLARENCE P. BYRNES.